(12) United States Patent
Chen

(10) Patent No.: US 11,400,990 B1
(45) Date of Patent: Aug. 2, 2022

(54) BIKE DROPPER SEATPOST WITH ROTATABLY ADJUSTABLE WIRE CONTROLLER

(71) Applicant: Yong-Fu Chen, Taichung (TW)

(72) Inventor: Yong-Fu Chen, Taichung (TW)

(73) Assignee: SCADA INTERNATIONAL CO., LTD., Taichung (TW)

( * ) Notice: Subject to any disclaimer, the term of this patent is extended or adjusted under 35 U.S.C. 154(b) by 0 days.

(21) Appl. No.: 17/405,023

(22) Filed: Aug. 18, 2021

(51) Int. Cl.
*B62J 1/02* (2006.01)

(52) U.S. Cl.
CPC ...................................... *B62J 1/02* (2013.01)

(58) Field of Classification Search
CPC ........ B62J 1/08; B62J 2001/085; B62K 19/36
See application file for complete search history.

(56) References Cited

U.S. PATENT DOCUMENTS

| | | | | |
|---|---|---|---|---|
| 8,177,251 B2* | 5/2012 | Shirai | ........................ | B62J 1/08 280/288.4 |
| 8,308,124 B2* | 11/2012 | Hsu | ............................ | B62J 1/08 248/161 |
| 9,688,331 B1* | 6/2017 | Shirai | ........................ | B62J 1/08 |
| 10,787,215 B1* | 9/2020 | Staples | ....................... | B62J 1/08 |

* cited by examiner

*Primary Examiner* — Sarah B McPartlin

(57) ABSTRACT

A wire controller of a dropper seatpost includes a pneumatic elevation rod, an outer tube, a wire controller assembly and a C-ring. The pneumatic elevation rod includes an inner tube, an actuation rod and a collar. The outer tube has a first end with a collar fixer and a second end with an annular recess. The collar is fastened to the collar fixer. The wire controller assembly includes a blocking body with a blocking mount and a wiring base with a wire pulling lever. The blocking body is received in the second end. The actuation rod is blocked by the blocking mount. The C-ring is compressively received in the annular recess and abuts against the blocking body to make the wire controller assembly rotatably fixed and received in the second end of the outer tube.

6 Claims, 5 Drawing Sheets

2

BIKE DROPPER SEATPOST WITH ROTATABLY ADJUSTABLE WIRE CONTROLLER

BACKGROUND

Technical Field

The invention relates to bicycles, particularly to seatposts.

Related Art

As shown in FIG. 5, a conventional bicycle dropper seatpost includes a pneumatic rod 50, an outer tube 60 and a wire controller assembly 70. The wire controller assembly 70 is formed with an outer thread 71, and the outer tube 60 is formed with an inner thread 61. The pneumatic rod 50 is fixed to the top of the outer tube 60. The wire controller assembly 70 is fixed to the outer tube 60 by screwing the outer thread 71 and the inner thread 61. Thus, the pneumatic rod 50 is in contact with the wire controller assembly 70. However, the wire controller assembly 70 has a directional limit in assembling, so the wire controller assembly 70 cannot be further rotated to make a positional adjustment after the screwing connection. This makes a problem in assembling and adjustment.

SUMMARY

An object of the invention is to provide a bike dropper seatpost, whose wire controller assembly can be rotatably adjusted after assembling.

The invention provides a bike dropper seatpost, which includes a pneumatic elevation rod, an outer tube, a wire controller assembly and a C-ring. The pneumatic elevation rod includes an inner tube, an actuation rod and a collar. The outer tube has a first end and a second end. The inside of the first end is provided with a collar fixer. The inside of the second end is formed with an annular recess. The actuation rod penetrates through the outer tube. The collar is fastened to the collar fixer. The wire controller assembly includes an actuation rod blocking body and a wiring base. The actuation rod blocking body has a blocking mount. The wiring base has a wire pulling lever. The actuation rod blocking body is received in the second end of the outer tube. The actuation rod is blocked by the blocking mount. The C-ring has a ring body and an opening. The ring body is compressively received in the annular recess. The ring body abuts against the actuation rod blocking body to make the wire controller assembly rotatably fixed and received in the second end of the outer tube.

Preferably, the collar is formed with an outer thread, and the collar fixer of the first end of the outer tube is formed with an inner thread. The pneumatic elevation rod is fastened to the outer tube by screwing the outer thread of the collar and the inner thread of the collar fixer.

Preferably, the actuation rod blocking body of the wire controller assembly is formed by injection molding with sheathing a metal body. This can enhance the impact tolerance when the pneumatic elevation rod and the outer tube suffer downward impacts.

Preferably, the blocking mount of the wire controller assembly is annularly disposed with a flexible washer. The top surface of the flexible washer is formed with protrusive spots which are annularly arranged. This can enhance the impact tolerance when the pneumatic elevation rod and the outer tube suffer downward impacts.

Preferably, an end of the ring body of the C-ring is formed with a notch. The notch makes the ring body easy to be forced to offer assembling assistance.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
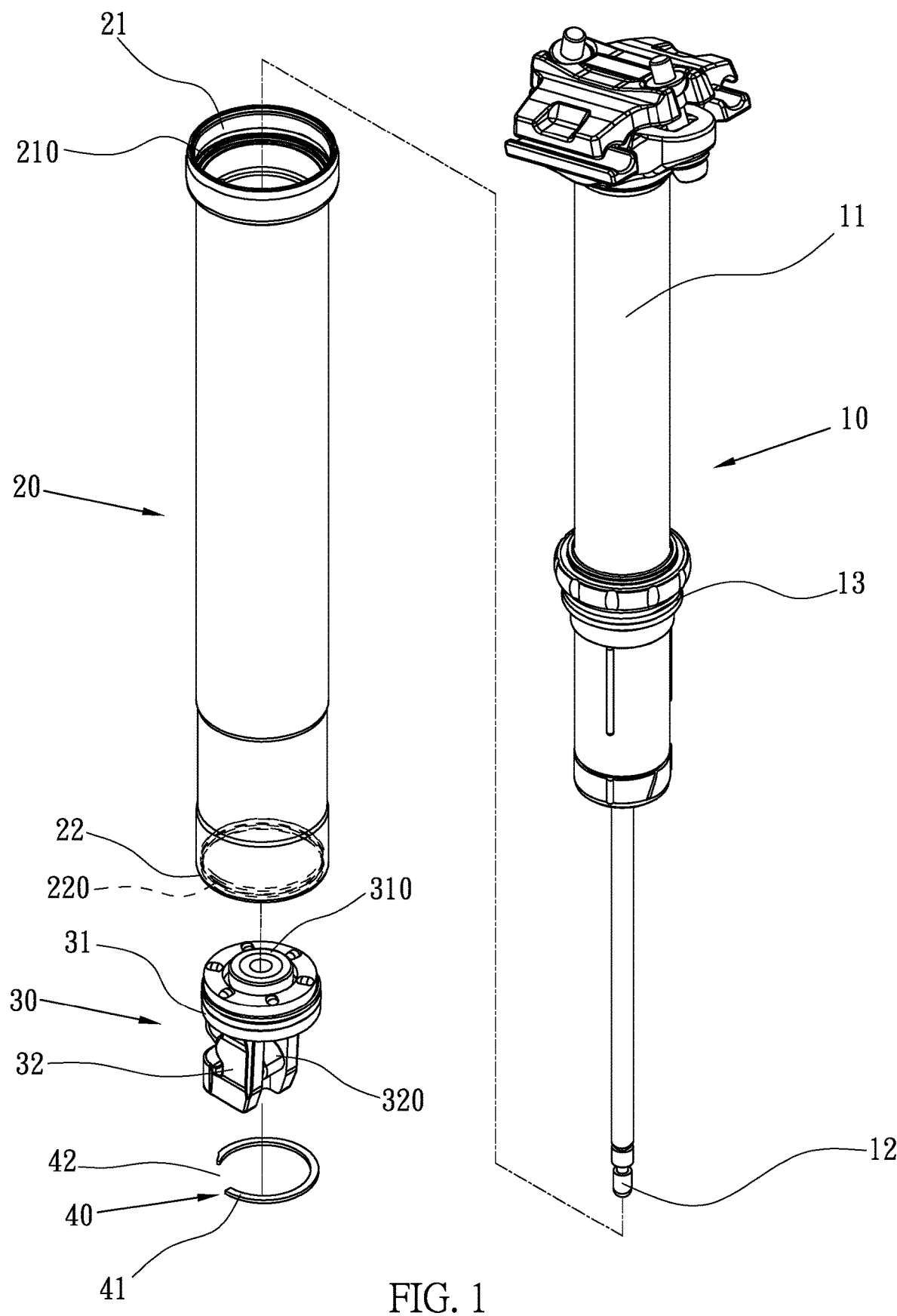
FIG. 1 is a partially exploded view of the invention.
Figure 2:
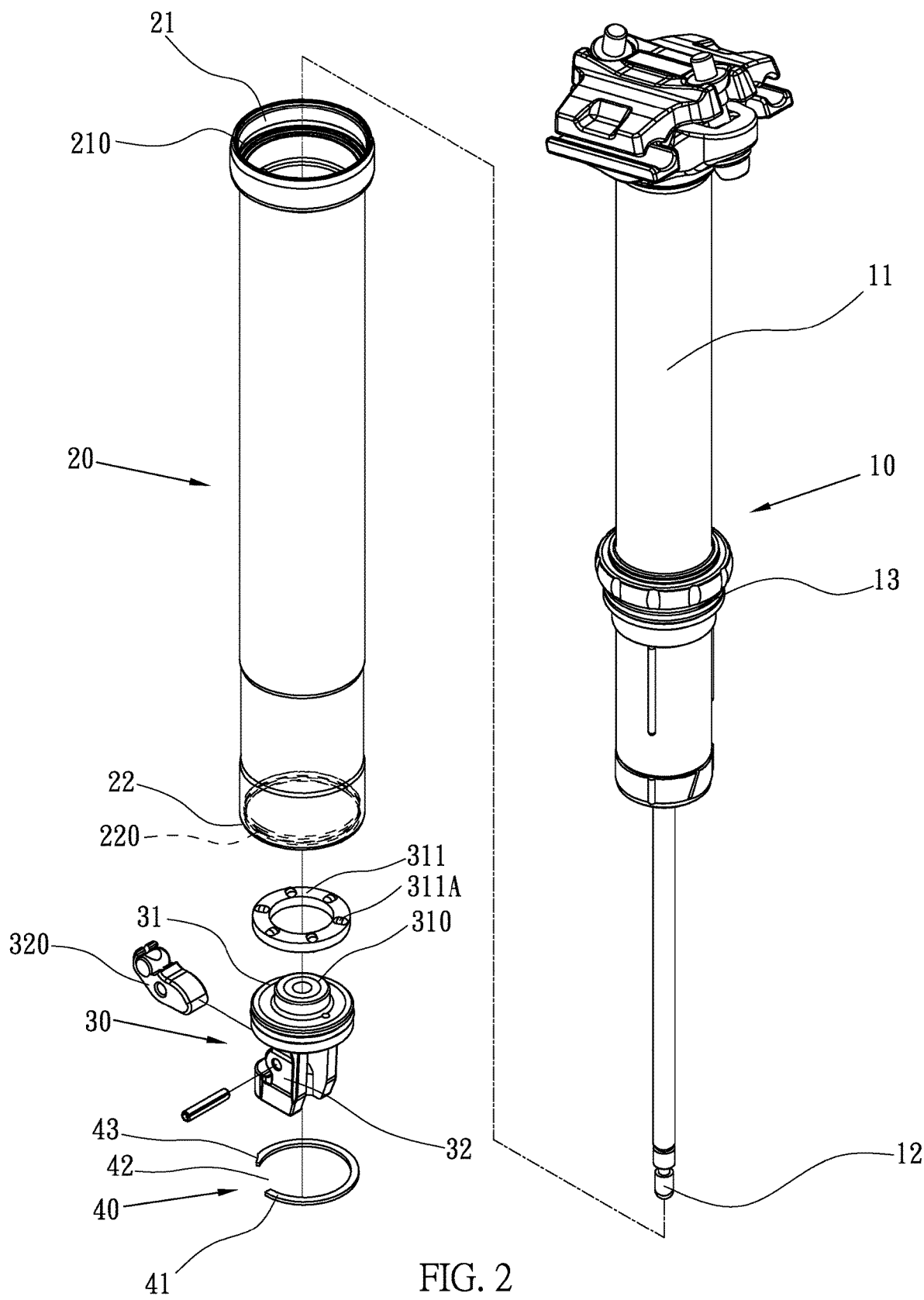
FIG. 2 is a fully exploded view of the invention.
Figure 3:
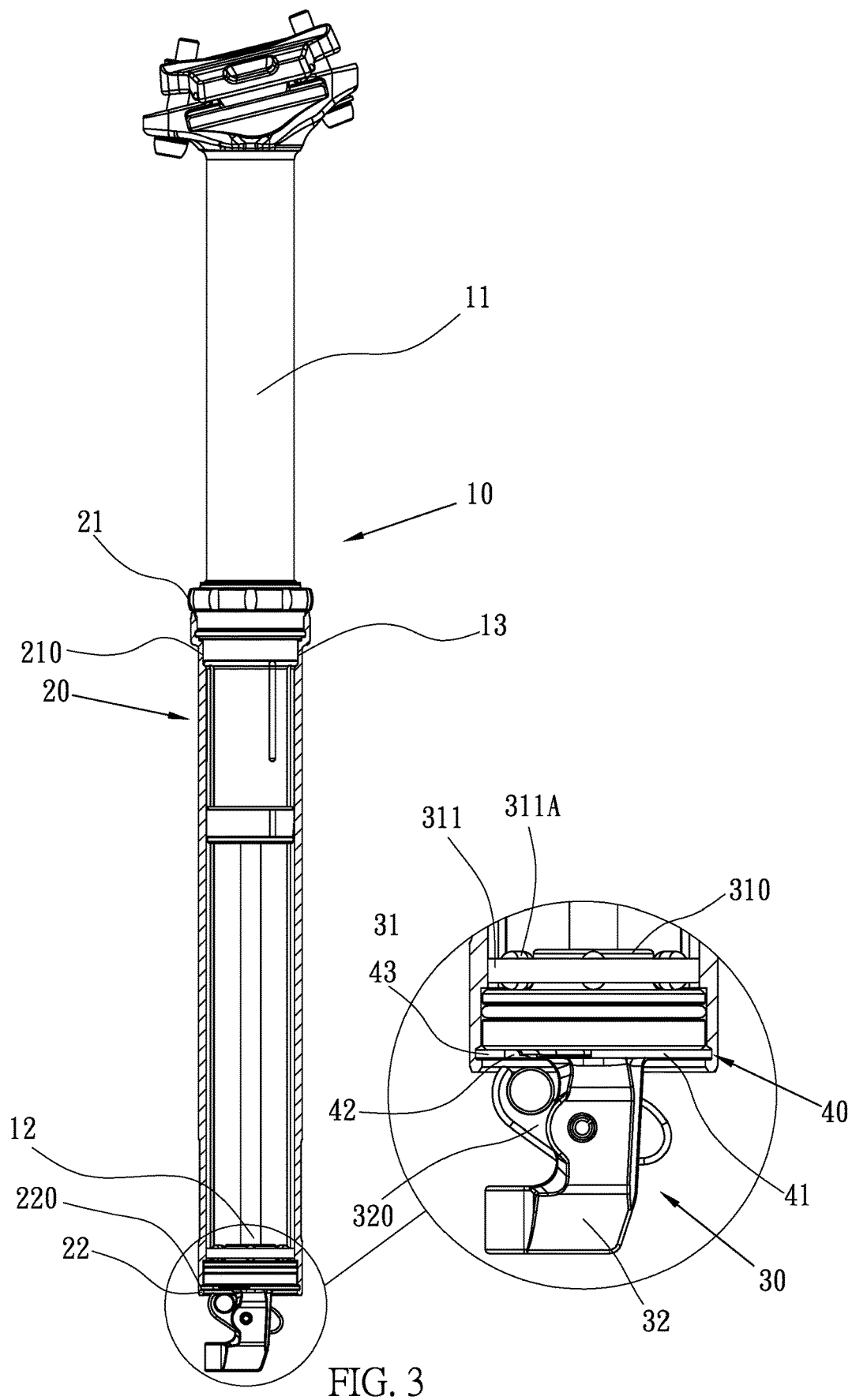
FIG. 3 is a partially cross-sectional view of the invention.
Figure 4:
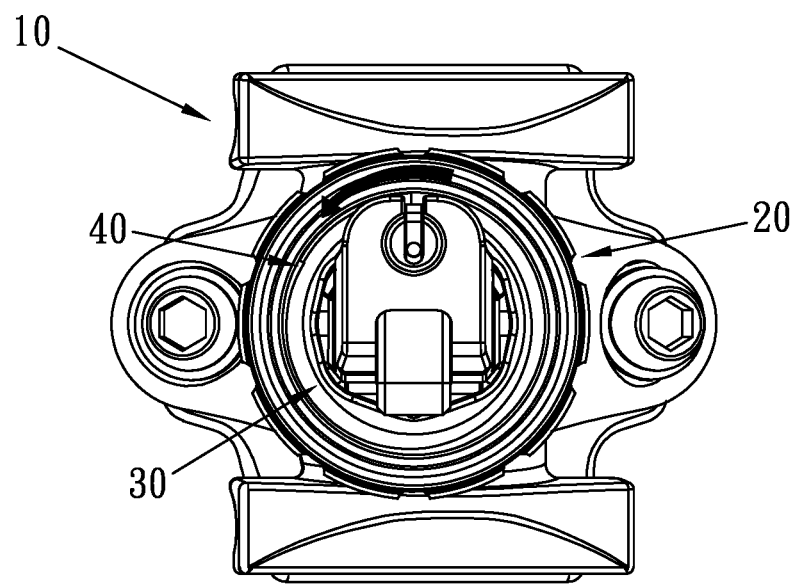
FIG. 4 is a schematic top view of the invention, which shows the rotary adjustment of the wire controller assembly relative to the outer tube.
Figure 4:
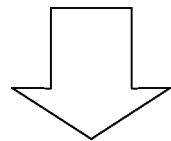
Figure 4:
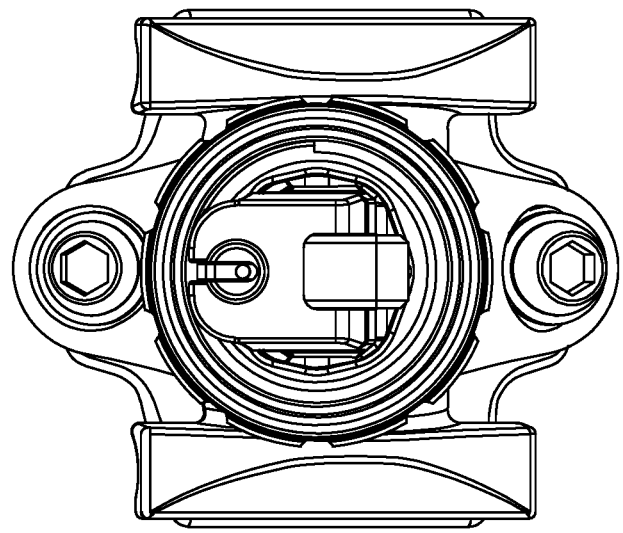
Figure 5:
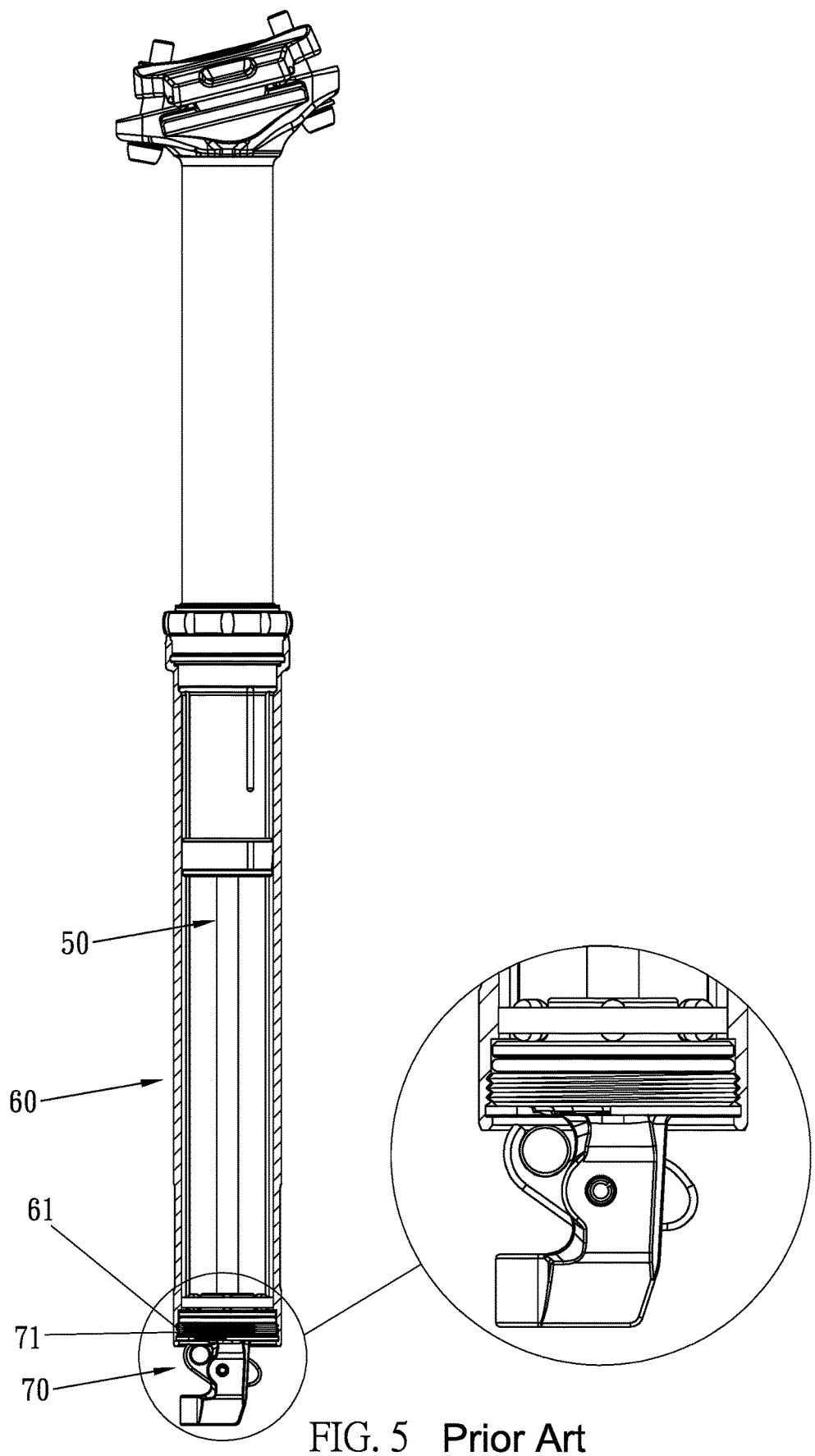
FIG. 5 is a schematic view of the screwing connection of a conventional dropper seatpost.

Please refer to FIGS. 1-3. The bike dropper seatpost of the invention includes a pneumatic elevation rod 10, an outer tube 20, a wire controller assembly 30 and a C-ring 40. The pneumatic elevation rod 10 includes an inner tube 11, an actuation rod 12 and a collar 13.

The outer tube 20 has a first end 21 and a second end 22. The inside of the first end 21 is provided with a collar fixer 210. The inside of the second end 22 is formed with an annular recess 220. The actuation rod 12 penetrates through the outer tube 20. The collar 13 is fastened to the collar fixer 210.

The wire controller assembly 30 includes an actuation rod blocking body 31 and a wiring base 32. The actuation rod blocking body 31 has a blocking mount 310. The wiring base 32 has a wire pulling lever 320. The actuation rod blocking body 31 is received in the second end 22 of the outer tube 20. The actuation rod 12 is blocked by the blocking mount 310.

The C-ring 40 has a ring body 41 and an opening 42. The ring body 41 is compressively received in the annular recess 220 of the second end 22 of the outer tube 20. The ring body 41 abuts against the actuation rod blocking body 31 to make the wire controller assembly 30 rotatably fixed and received in the second end 22 of the outer tube 20.

Please refer to FIGS. 1-4. The actuation rod 12 penetrates through the outer tube 20. The collar 13 is fastened to the collar fixer 210. The actuation rod blocking body 31 is received in the second end 22 of the outer tube 20. The actuation rod 12 is blocked by the blocking mount 310. The ring body 41 is compressively received in the annular recess 220 of the second end 22 of the outer tube 20. The ring body 41 abuts against the actuation rod blocking body 31 to make the wire controller assembly 30 rotatably fixed and received in the second end 22 of the outer tube 20.

By the arrangement of the pneumatic elevation rod 10, the outer tube 20, the wire controller assembly 30 and the C-ring 40, the pneumatic elevation rod 10 and the wire controller assembly 30 are received in the outer tube 20 by the C-ring 40, so that the wire controller assembly 30 may be 360-degree rotated relative to the outer tube 20. This makes the assembling process easier because of no directional limit. The angular position of the wire controller assembly 30 can be rapidly and easily rotated and adjusted.

Please refer to FIG. 2. Preferably, the collar 13 is formed with an outer thread, and the collar fixer 210 of the first end 21 of the outer tube 20 is formed with an inner thread. The pneumatic elevation rod 10 is fastened to the outer tube 20 by screwing the outer thread of the collar 13 and the inner thread of the collar fixer 210.

Preferably, the actuation rod blocking body 31 of the wire controller assembly 30 is formed by injection molding with sheathing a metal body. This can enhance the impact tolerance when the pneumatic elevation rod 10 and the outer tube 20 suffer downward impacts.

Preferably, the blocking mount 310 of the wire controller assembly 30 is annularly disposed with a flexible washer 311. The top surface of the flexible washer 311 is formed with protrusive spots 311A which are annularly arranged. This can enhance the impact tolerance when the pneumatic elevation rod 10 and the outer tube 20 suffer downward impacts.

Preferably, an end of the ring body 41 of the C-ring 40 is formed with a notch 43. The notch 43 makes the ring body 41 easy to be forced to offer assembling assistance.

While this disclosure has been described by means of specific embodiments, numerous modifications and variations could be made thereto by those skilled in the art without departing from the scope and spirit of this disclosure set forth in the claims.

What is claimed is:

1. A bike dropper seatpost comprising:
    a pneumatic elevation rod, comprising an inner tube, an actuation rod and a collar;
    an outer tube, having a first end and a second end, an inside of the first end being provided with a collar fixer, an inside of the second end being formed with an annular recess, the actuation rod penetrating through the outer tube, and the collar being fastened to the collar fixer;
    a wire controller assembly, comprising an actuation rod blocking body and a wiring base, the actuation rod blocking body having a blocking mount, the wiring base having a wire pulling lever, the actuation rod blocking body being received in the second end of the outer tube, and the actuation rod being blocked by the blocking mount; and
    a C-ring, having a ring body and an opening, the ring body being compressively received in the annular recess, and the ring body abutting against the actuation rod blocking body to make the wire controller assembly rotatably fixed and received in the second end of the outer tube.

2. The bike dropper seatpost of claim 1, wherein the collar is formed with an outer thread, the collar fixer of the first end of the outer tube is formed with an inner thread, and the pneumatic elevation rod is fastened to the outer tube by screwing the outer thread of the collar and the inner thread of the collar fixer.

3. The bike dropper seatpost of claim 1, wherein the actuation rod blocking body of the wire controller assembly is formed by injection molding with sheathing a metal body.

4. The bike dropper seatpost of claim 1, wherein the blocking mount of the wire controller assembly is annularly disposed with a flexible washer, and a top surface of the flexible washer is formed with protrusive spots which are annularly arranged.

5. The bike dropper seatpost of claim 1, wherein an end of the ring body of the C-ring is formed with a notch.

6. The bike dropper seatpost of claim 1, wherein the wire controller assembly is capable of 360-degree rotating relative to the outer tube.

* * * * *